United States Patent [19]
Smrcka

[11] Patent Number: 5,526,707
[45] Date of Patent: *Jun. 18, 1996

[54] FETAL INSERT ASSEMBLY FOR A FEMALE CRASH TEST DUMMY

[75] Inventor: Joseph G. Smrcka, Northville, Mich.

[73] Assignee: First Technology Safety Systems, Inc., Plymouth, Mich.

[*] Notice: The term of this patent shall not extend beyond the expiration date of Pat. No. 5,528,943.

[21] Appl. No.: 246,619

[22] Filed: May 20, 1994

[51] Int. Cl.⁶ ..................................................... G01F 15/06
[52] U.S. Cl. ............................................................. 73/866.4
[58] Field of Search .......................... 73/866.4; 434/267, 434/269, 270, 272, 273

[56] References Cited

U.S. PATENT DOCUMENTS

| | | |
|---|---|---|
| 1,882,575 | 10/1932 | Hanks . |
| 3,762,069 | 10/1973 | Culver . |
| 3,826,019 | 7/1974 | Knapp et al. ........................... 434/273 |
| 3,841,163 | 10/1974 | Daniel . |
| 4,411,629 | 10/1983 | Voights ................................... 434/266 |
| 4,701,132 | 10/1987 | Groesch et al. . |

OTHER PUBLICATIONS

*Anthropomorphic Test Devices, Hybrid III, 5th Percentile Small Female Dummy*, First Technology Safety Systems, Inc., 2 pages, 1992, U.S.A.
*Anthropomorphic Test Devices, Hybrid III, 50th Percentile Male Test Dummy*, First Technology Safety Systems, Inc., 2 pages, 1992, U.S.A.
*Anthropomorphic Test Devices, Hybrid III, 95th Percentile Large Male Test Dummy*, First Technology Safety Systems, Inc., 2 pages, 1992, U.S.A.
*Anthropomorphic Test Devices, Hybrid II, 50th Percentile Male Test Dummy*, First Technology Safety Systems, Inc., 2 pages, 1992, U.S.A.
*Anthropomorphic Test Devices, Side Impact Dummy*, First Technology Safety Systems, Inc., 2 pages, 1992, U.S.A.
*Anthropomorphic Test Devices, Biofidelic Side Impact Dummy*, First Technology Safety Systems, Inc., 2 pages, 1992, U.S.A.
*Infant Dummy Model CAMI–II*, First Technology Safety Systems, Inc. 1 page, 1993, U.S.A.
*Anthropomorphic Test Devices, CRABI Six–month Old Infant Dummy*, First Technology Safety Systems, Inc. 2 pages, 1991, U.S.A.
*Anthropomorphic Test Devices, Three–year Old Child Dummy*, First Technology Safety Systems, Inc. 2 pages, 1992, U.S.A.
*Anthropomorphic Test Devices, Six–year Old Child Dummy*, First Technology Safety Systems, Inc. 2 pages, 1992, U.S.A.

Primary Examiner—Robert Raevis
Attorney, Agent, or Firm—Howard & Howard

[57] ABSTRACT

An apparatus for simulating a pregnant female human during a crash test includes a torso having an abdominal cavity formed therein for receiving a fetal abdominal assembly. The fetal abdominal assembly includes a fetal body simulating a human fetus in shape and weight, a fetal insert with a fetal cavity for receiving the fetal body and an abdominal shell removably retained in the abdominal cavity with an insert cavity for receiving the fetal insert. The fetal insert has a wall with an elongated slit formed therein whereby when the wall is deformed, an opening is formed through which the fetal body is inserted into and removed from the fetal cavity. The fetal abdominal insert and the fetal body are formed from different castable urethane elastomer materials. The abdominal shell and a chest flesh assembly are formed from a polyurethane foam. A jacket covers the torso and at least a portion of the fetal abdominal insert and has zippers extending between an open bottom end and a neck opening, a right arm opening and a left arm opening.

15 Claims, 3 Drawing Sheets

FETAL INSERT ASSEMBLY FOR A FEMALE CRASH TEST DUMMY

BACKGROUND OF THE INVENTION

The present invention relates generally to anthropomorphic test dummies of the type utilized for aviation and automotive crash research and, in particular, to such a test dummy simulating a pregnant female.

Test dummies are a very important tool for use in evaluating the crashworthiness of vehicles. In fact, such dummies have become the stars of television, radio and print media advertisements. In the field of automotive crash test research, various types of dummies have been developed to represent a range of sizes of adults and children associated with the human population.

A full line of anthropomorphic test dummies is available from First Technology Safety Systems, Inc. of Plymouth, Mich. Included in the line are a BioSID side impact test dummy, Hybrid III test dummies in ninety-fifth percentile male, fifth percentile female, and fiftieth percentile configurations, a Side Impact model 572-SID test dummy, a Hybrid II fiftieth percentile test dummy, six-year-old and three-year-old child test dummies, a three-year-old airbag test dummy, a model CAMI-II infant test dummy, and VIP model test dummies in ninety-fifth and fifth percentile configurations.

The BioSID test dummy utilizes Hybrid III head, neck and leg assemblies and six ribs which are an adaptation of the Hybrid III design constructed from vascomax steel and oriented 90° so that the faces of the ribs are turned toward the area of impact. The BioSID pelvis is capable of accepting a pubic and sacrum load cell. The Hybrid III ninety-fifth percentile male and the Hybrid III fifth percentile female test dummies include a three- or six-axis neck transducer, submarining indicator pelvis, chest displacement transducer, tibia-femur displacement transducers and mounts for head, chest and pelvis accelerometers. The Hybrid III fiftieth percentile test dummy eliminates the submarining indicator pelvis used on the other Hybrid III dummies and meets the specifications for the FMVSS 208 option specified in 49 CFR Part 572 Subpart E.

The Side Impact model 572-SID test dummy meets the specifications for the FMVSS 208 standard specified in 49 CFR Part 572 Subpart F utilizing Hybrid II head, neck and lower leg assemblies with upper and lower torso assemblies designed for side impacts. The Hybrid II fiftieth percentile test dummy meets the specifications for the FMVSS 208 standard specified in 49 CFR Part 572 Subpart B including mounts for head, chest and pelvis accelerometers.

The six-year-old child test dummy meets the specifications for the proposed FMVSS 208 standard and includes mounts for head, chest and pelvis accelerometers. The three-year-old test dummy meets the specifications for the FMVSS 213 standard specified in 49 CFR Part 572 Subpart C and includes mounts for head and chest accelerometers.

The three-year-old child airbag test dummy is of an experimental sit/stand construction. The infant test dummy meets the specifications for the FMVSS 213 standard specified in 49 CFR Part 572 Subpart D. and includes mounts for head, chest and pelvis accelerometers. The VIP test dummies include mounts in the head and chest for accelerometers.

SUMMARY OF THE INVENTION

The present invention concerns an apparatus for simulating a pregnant female human during a crash test. A crash test dummy includes a torso having a upper chest portion and a lower abdominal portion, the lower abdominal portion having an abdominal cavity formed therein for receiving an abdominal insert. A fetal abdominal insert includes a fetal body simulating a human fetus in shape and weight, the fetal body having a head portion and a chest portion connected to the head portion, and a fetal abdominal insert removably retained in the abdominal cavity of the torso, the fetal abdominal insert having a wall extending about and enclosing a fetal cavity for receiving and retaining the fetal body. The wall has an elongated slit formed therein, the elongated slit having abutting sides and the wall being formed of a flexible material whereby when the wall is deformed to separate the abutting sides, an opening is formed through which the fetal body is inserted into and removed from the fetal cavity. The fetal abdominal insert and the fetal body are formed from a castable urethane elastomer utilizing different combinations of components to achieve the desired results.

A first triaxial accelerometer is mounted in the head portion of the fetal body for sensing acceleration in each of three predetermined directions when force applied to the fetal abdominal insert causes the fetal body to move and a second triaxial accelerometer is mounted in chest portion of the fetal body for sensing acceleration in each of the three predetermined directions when force applied to the fetal abdominal insert causes the fetal body to move.

A load sensing means is attached to the lower abdominal portion of the torso adjacent the fetal abdominal insert whereby force applied to the fetal abdominal insert is sensed by the load sensing means. The load sensing means includes a mounting plate, bracket means attached to the lower abdominal portion of the torso and a plurality of load cells mounted on the bracket means, the mounting plate being positioned between the fetal abdominal insert and the load cells whereby force applied to the fetal abdominal insert which causes the mounting plate to abut the load cells is sensed by the load cells.

A jacket covers the torso and at least a portion of the fetal abdominal insert and is formed from a foamed rubber material. The jacket has an open bottom end and has a neck opening, a fight arm opening and a left arm opening formed therein. A first closure means extends from the neck opening to the open bottom end, a second closure means extends from the fight arm opening to the open bottom end and a third closure means extends from the left arm opening to the open bottom end.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figures 1, 2:
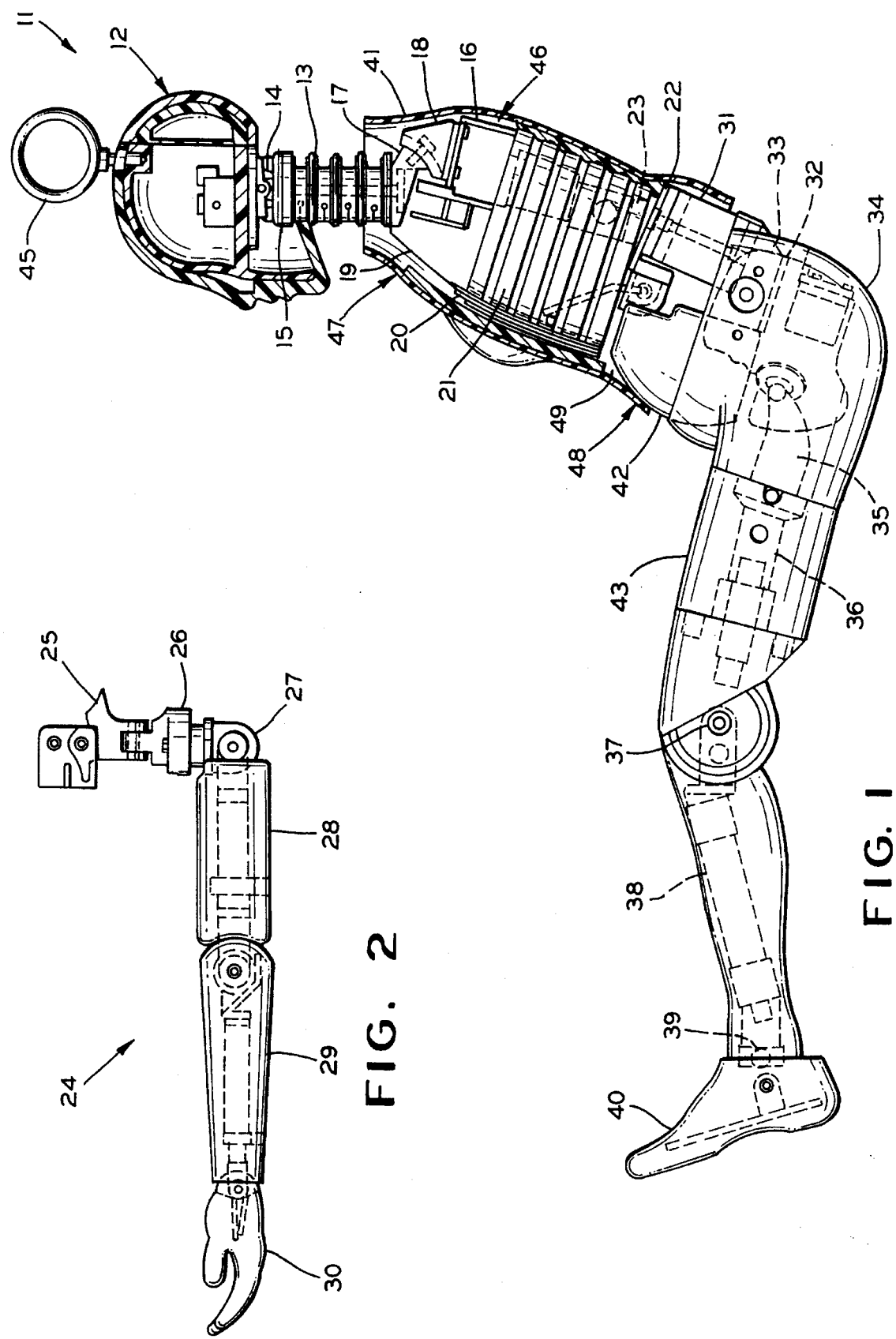
FIG. 1 is a side elevation view of a prior art female test dummy of a sit construction.
FIG. 2 is a top plan view of a left arm used with the dummy shown in the FIG. 1.

In the FIG. 1 there is shown a crash test dummy 11 of the Hybrid III fifth percentile female type in a sitting position. This dummy is used primarily to test the performance of automotive interiors and restraint systems for very small adult front and rear seat occupants. The size and weight of the test dummy 11 are based on anthropometric studies by the Human Biomechanics and Simulation Standards Committee Task Force of the Society of Automotive Engineers and represent the lower extreme of the USA adult population. Ranges of motions, centers of gravity and segment masses simulate those of human subjects defined by the anthropometric data.

The, dummy 11 has a head assembly 12 which is shown in cross-section and includes a one-piece cast aluminum skull and one-piece skull cap both covered by a vinyl skin. The skull cap is removable for access to head instrumentation contained inside the head assembly 12. The head assembly 12 is mounted at the top end of a neck assembly 13 by a nodding block 14 and a nodding joint 15. A lower end of the neck assembly 13 extends into a torso area of the dummy 11 and is connected to an upper end of a thoracic spine 16 by an upper neck bracket 17 connected to a lower neck bracket 18. The torso area of the dummy 11 is shown in cross-section to reveal a bib assembly 19 having an upper end connected to the upper neck bracket 17 and a lower end connected to a sternum assembly 20. A rib set 21 has a plurality of ribs connected between the sternum assembly 20 and the thoracic spine 16. The lower end of the spine 16 is connected to a spine mounting weldment 22 by an adapter assembly 23.

The dummy 11 shown in the FIG. 1 also has a pair of arm assemblies including a right arm assembly which is hidden from view and a left arm assembly which has been removed to reveal the interior of the torso. There is shown in the FIG. 2 a left arm assembly 24 representing both the left and fight arms which are attached to the test dummy 11. The arm assembly 24 includes a clavicle link 25 which connects a clavicle 26 to the top of the thoracic spine 16. The clavicle 26 is connected to a shoulder yoke 27 which in turn is connected to an upper end of an upper arm assembly 28. A lower end of the upper arm assembly 28 is connected to an upper end of a lower arm assembly 29. A lower end of the lower arm assembly 29 is connected to a left hand assembly 30. The right arm assembly is constructed in a similar manner.

As shown in the FIG. 1, the spine mounting weldment 22 is connected to an upper end of a lumbar spine 31. A lower end of the lumbar spine 31 is connected to a lumbar-thoracic adapter 32 which is connected to a lumbar to pelvic adapter 33. A pelvis assembly 34 is connected to the adapter 33. A femur and flange assembly 35 for a left leg has one end connected to the pelvis assembly 34. An opposite end of the assembly 35 is connected to a thigh bone 36 having an opposite end connected to a sliding knee assembly 37. One end of a tibia 38 is connected to the knee assembly 37 and an opposite end is connected to an ankle rotation assembly 39. The ankle rotation assembly 39 is connected to a left foot 40. Although only a left leg is shown, a right leg is similar in construction.

The various components of the test dummy 11 are covered in a vinyl skin such as the chest flesh and skin assembly 41 which extends from the lower end of the neck assembly 13 to a central portion of the lumbar spine 31. A lower end of the chest flesh and skin assembly 41 partially covers an upper portion of an abdominal insert 42 positioned in the lower torso. A lower portion of the abdominal insert 42 is covered by an upper portion of the pelvis assembly 34. A thigh flesh and skin 43 covers the thigh bone 36 and a lower leg flesh/skin 44 covers the portion of the leg between the knee and the foot. A lifting ring 45 is attached to the head assembly 12 for lifting the test dummy 11 into and out of test fixtures and vehicles.

The crash test dummy 11 can be used to construct a female crash test dummy having a fetal insert according to the present invention. The dummy 11 has a torso 46 which extends from the lower end of the neck assembly 13 to the pelvis assembly 34. An upper chest portion 47 includes the thoracic spine 16, the bib assembly 19, the sternum assembly 20, the rib set 21 and the adapter assembly 23. A lower abdominal portion 48 includes the spine mounting weldment 22, the lumbar spine 31, the lumbar-thoracic adapter 32 and the lumbar to pelvic adapter 33. The abdominal portion 48 has an abdominal cavity 49 formed therein for releasably retaining the abdominal insert 42.

Figure 3:
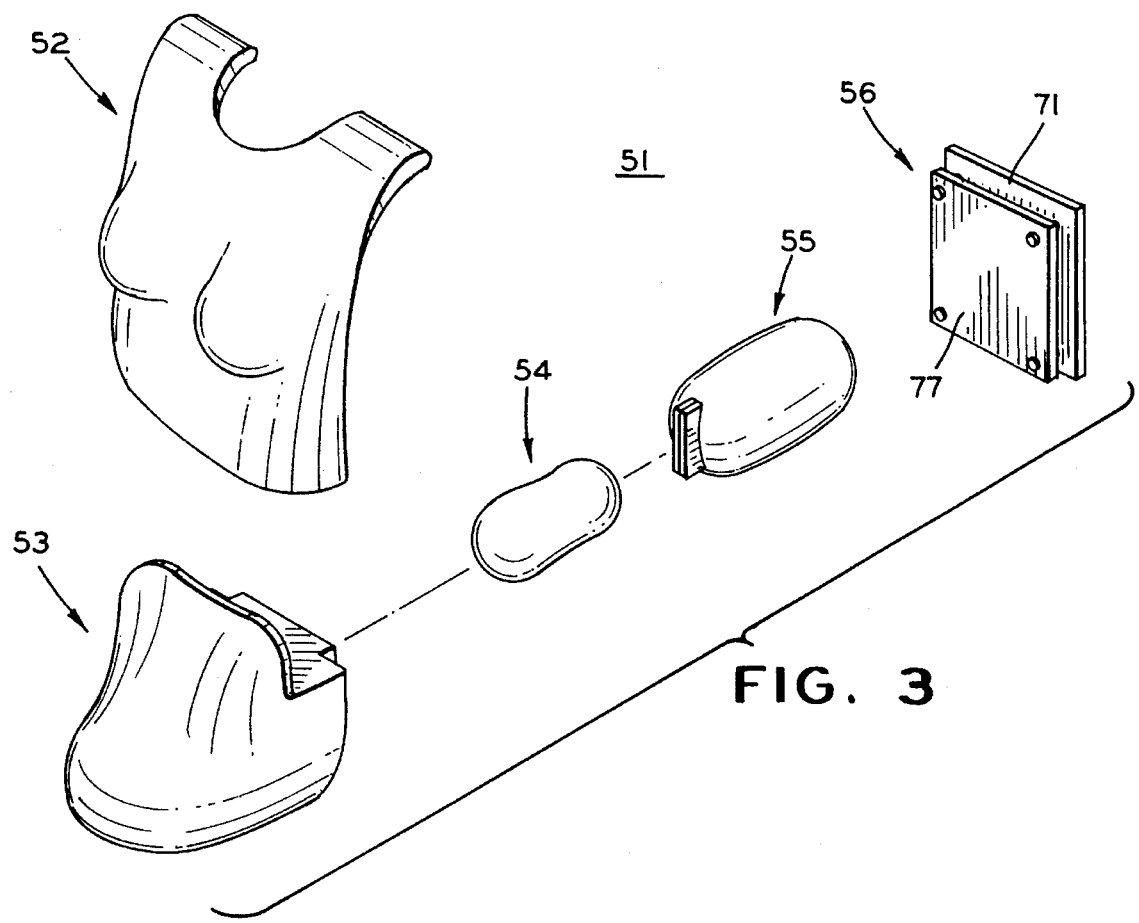
FIG. 3 is an exploded perspective view of a fetal insert assembly according to the present invention for use in the female test dummy shown in the FIG. 1.
Figure 4:
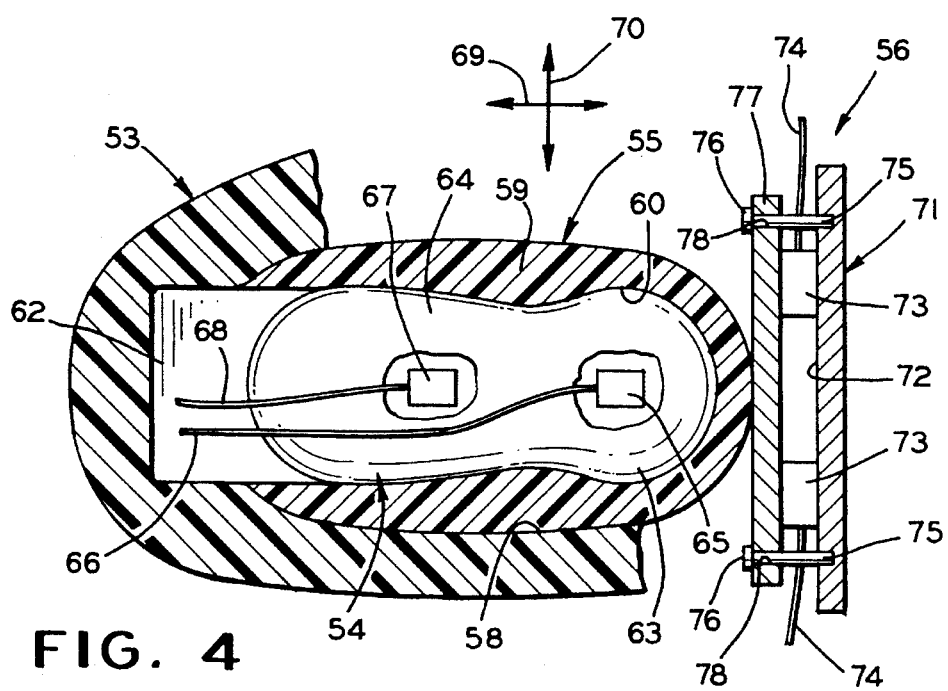
FIG. 4 is an enlarged cross-sectional side elevation view of the fetal insert assembly shown in the FIG. 3.
Figure 7:
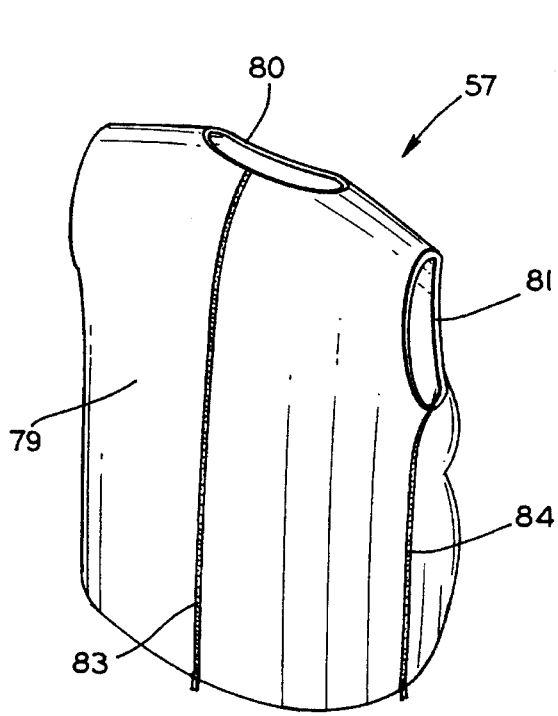
FIG. 7 is a rear perspective view of a jacket according to the present invention used with the dummy shown in the FIG. 1 and the fetal insert assembly shown in the FIG. 3.
Figure 8:
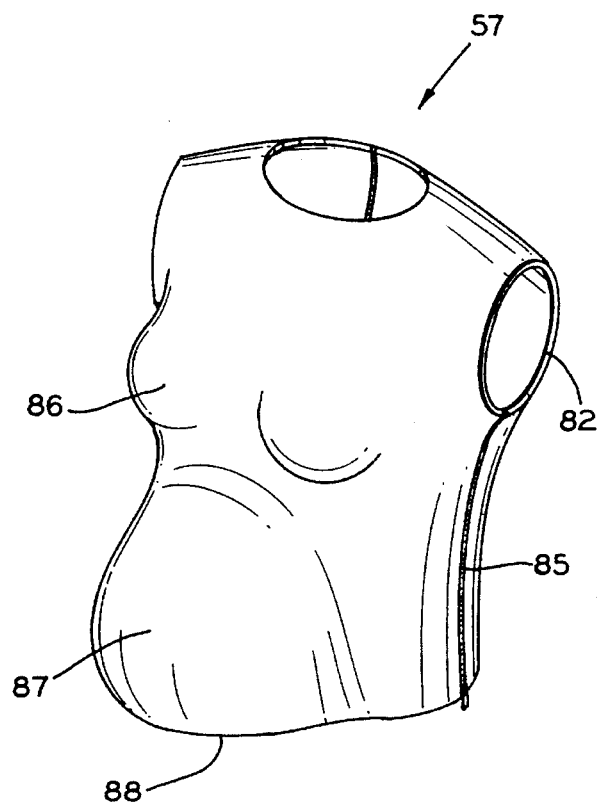
FIG. 8 is a front perspective view of the jacket shown in the FIG. 7.

There is shown in the FIGS. 3 and 4, a fetal insert assembly 51 which replaces the chest flesh and skin assembly 41 and the abdominal insert 42 shown in the FIG. 1 to convert the standard test dummy 11 into a test dummy in accordance with the present invention. The fetal insert assembly 51 includes a chest flesh assembly 52, an abdominal shell 53, a fetal body 54, a fetal insert 55, a sensor assembly 56 and a jacket 57 (shown in the FIGS. 7 and 8). The chest flesh and skin assembly 41 is removed from the torso 46 and is replaced by the chest flesh assembly 52. The chest flesh assembly 52 is formed to cover the front and part of the sides of the upper chest portion 47. The abdominal insert 42 is removed from the abdominal cavity 49 and the sensor assembly 56 is mounted at the rear of the cavity as described below, The fetal body 54 is placed inside the fetal insert 55 to form a subassembly which is placed inside the abdominal shell 53 as described below, The abdominal shell 53 is then placed into the abdominal cavity 49, The jacket 57 shown in the FIGS. 7 and 8 is placed on the dummy to cover the torso 46.

Figure 5:
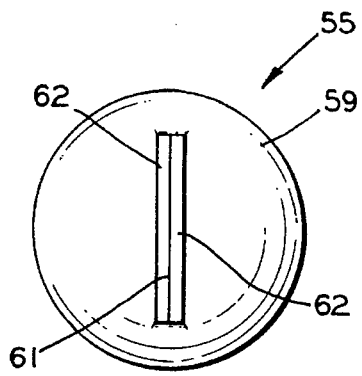
FIG. 5 is a front elevation view of the abdominal insert shown in the FIG. 3.
Figure 6:
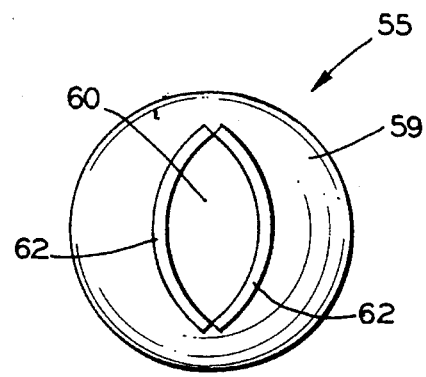
FIG. 6 is a front elevation view, similar to the FIG. 5, showing an opening in the abdominal insert.

The abdominal shell 53 is shaped like a pregnant female abdomen and has a insert cavity 58 formed therein which is open at the rear of the shell for receiving the fetal insert 55. The fetal insert 55 is formed as a hollow body having a wall 59 extending about and enclosing a fetal cavity 60. The cavity 60 can be contoured to snugly retain the fetal body 54. As shown in the FIG. 5, the wall 59 of the fetal insert 55 has an elongated slit 61 formed therein extending generally vertically. Extending outwardly from the wall 59 on opposite sides of the slit 61 is a pair of flanges 62. In the normal position shown in the FIGS. 5, facing surfaces of the flanges 62 abut one another at the slit 61. However, the fetal insert 55 is formed of a flexible material such that the wall 59 can be deformed to provide access to the fetal cavity 60 through the slit 61. As shown in the FIG. 6, the abdominal insert 55 has been deformed, typically by exerting pressure on the wall 59 adjacent the upper and lower ends of the flanges 62, to force the flanges 62 away from one another and expose the fetal cavity 60. In this manner, an object, such as the fetal body 54, can be inserted into and removed from the fetal cavity 60.

As shown in the FIG. 4, the fetal body 54 simulating a human fetus in size and weight can be inserted into the fetal cavity 60. The fetal body 54 has a head portion 63 connected to a chest portion 64. The fetal body 54 is formed of a generally rigid material in a shape and weight to simulate a human fetus. A first transducer 65 can be mounted in the head portion 63 of the fetal body 54 for sensing movement caused by forces applied to the fetal insert 55 during a crash test. The first transducer 65 typically can be a triaxial accelerometer which is connected to a first cable 66 extending out of the fetal insert 55 through the slit 61. A second transducer 67 can be positioned in the chest portion 64 of the fetal body 54 for sensing movement caused by forces applied to the fetal insert 55. The second transducer 67 also can be a triaxial accelerometer which is connected to a second cable 68 which extends from the abdominal insert 55 through the slit 61.

Triaxial accelerometers, also known as three-axis transducers, are also utilized in various locations in the test dummy 11 shown in the FIG. 1. These transducers are available from First Technology Safety Systems, Inc. and measure acceleration along three mutually orthogonal axes known as the X axis; the Y axis, and the Z axis. A pair of double-headed arrows 69 and 70 represent the sensing directions for the first transducer 65 along the Z axis and the X axis respectively. Assuming that the fetal body 54 represents a human fetus lying on its back with its head at the right end thereof, the arrow 69 points toward and away from the top of the head and the arrow 70 points toward and away from the face. The Y axis is orthogonal to the other two axes and extends toward the sides of the head portion 63. In a similar fashion, the arrows 69 and 70 represent the Z axis and the X axis of the second transducer 67 respectively.

The, chest flesh assembly 52 and the abdominal shell 53 can be formed from a polyurethane material such as Foamex Polyurethane System XR-35 Neutral Brown Pigmented material available from Polyurethane Products Co. utilizing thirty-eight parts by weight of component "A" and one hundred fifty-two parts by weight of component "B". The fetal abdominal insert 55 and the fetal body 54 can be formed from a castable urethane elastomer known as "Skinflex III" of Durometer 34 and Shore A. The fetal abdominal insert 55 is made from Skinflex III components by mixing 300 grams of Skinflex III Part "A" into 600 grams of Skinflex III Part "B" and then mixing in 800 grams of Skinflex III Part "C". These components are available from Chembar, Inc. of Groveport, Ohio. The fetal body 54 is made by mixing 220 grams of Skinflex III Part "A" into 440 grams of Skinflex III Part "B" . Only plastic mixing containers and spatulas should be used and the bottom and sidewall of the container should be wiped several times thoroughly with the spatula during mixing. The components should be mixed for one to two minutes to ensure through blending. The facing surfaces of the mold and mold insert should be coated with Partingkote #8302 material available from Hexcel Corp. of Zeeland, Mich. The material is left in the mold overnight for demolding.

The sensor assembly 56 includes a bracket means such as a pelvis bracket 71 which is attached to the pelvis assembly 34 shown in the FIG. 1. A surface 72 of the pelvis bracket 71 faces the fetal insert 55 and has a load sensing means mounted thereon. The load sensing means includes a pair of load cells 73 each of which has a cable 74 connected thereto on which is generated a signal representing the load applied to the load cell. Extending outwardly from the surface 72 is a pair of studs 75, each of the studs having a stop 76 or head formed at an outer end thereof. A mounting plate 77 has a pair of apertures 78 formed therein through which the studs 75 extend. The mounting plate 77 is free to slide on the studs 75 between the stops 76 and the load cells 73. Typically, the travel distance for the mounting plate 77 is approximately 1/16 inch to 1/8 inch.

When the fetal insert 55, containing the fetal body 54, is forced against the mounting plate 77, such as during a crash test, the forces applied to the fetal insert 55 are transferred to the mounting plate 77 to force the mounting plate against the load cells 73 which sense the force being applied and generate signals on the cables 74. Although only two load cells 73 and two studs 75 are shown, an additional pair of each of the load cells and the studs is provided in a generally rectangular pattern on the surface 72 to guide the mounting plate 77 and measure the forces applied thereto.

The jacket 57, as shown in the FIGS. 7 and 8, is utilized in place of the chest flesh and skin assembly 41. The jacket 57 is formed from a material such as that used in wet suits and can have a fabric made from synthetic fibers bonded to the outer surface thereof. A rear portion 79 of the jacket 57 is shown in the FIG. 7. The jacket 57 has a neck opening 80 formed at an upper end thereof through which the neck assembly 13 extends when the jacket 57 is installed on the dummy 11. The jacket 57 also includes a pair of arm openings formed therein, a right arm opening 81 (FIG. 7) through which the fight arm extends and a left arm opening 82 (FIG. 8) through which the left arm 24 extends.

In order to enable the jacket 57 to be installed and removed from the torso 46 of the dummy 11 without removing the head assembly 12 or the arms, a plurality of closure means such as zippers 83, 84 and 85 have been provided. A first closure means or rear zipper 83 extends from the neck opening 80 to an open bottom end 88 of the jacket 57. A second closure means or right side zipper 84 extends from the arm opening 81 on the fight side of the jacket 57 to the open bottom end 88 of the jacket. A third closure means or left side zipper 85 extends from the arm opening 82 on the left side of the jacket 57 to the open bottom end 88 of the jacket. When the zippers 83, 84 and 85 are unzipped, the jacket 57 can be easily installed over the head 12 and the arms of the dummy 11 or removed therefrom.

As shown in the FIG. 8, the jacket 57 has a front surface which includes an upper breast portion 86 and a lower abdominal portion 87. The breast portion 86 is formed to simulate female breasts such as are included in the chest flesh assembly 52. The abdominal portion 87 is extended outwardly to cover the upper portion of and retain the abdominal shell 53 in the abdominal cavity 49. The jacket 57 typically is formed by cutting separate pieces and attaching them together and to the zippers to obtain the desired shape.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of forming a fetal insert assembly for a crash test dummy comprising:

a. making a first castable urethane elastomer by mixing approximately 220 grams of Skinflex III Part "A" and approximately 440 grams of Skinflex III Part "B";

b. making a second castable urethane elastomer by mixing approximately 300 grams of Skinflex III Part "A", approximately 600 grams of Skinflex III Part "B" and approximately 800 grams of Skinflex III Part "C";

c. placing the first castable urethane elastomer into a first mold to form a fetal body;

d. placing the second castable urethane elastomer into a second mold to form a fetal insert;

e. removing the first and second castable urethane elastomers for the first and second molds respectively after a demolding period; and f. assembling the fetal body and the fetal abdominal insert into a fetal insert assembly.

2. The method according to claim 1 wherein said step a. is performed by adding the: Skinflex III Part "A" to the Skinflex III Part "B" and mixing for approximately one to two minutes.

3. The method according to claim 1 wherein said steps b. is performed by adding the Skinflex III Part "A" to the Skinflex III Part "B", mixing for approximately one to two minutes, adding the Skinflex III Part "C" and mixing for approximately one to two minutes more.

4. The method according to claim 1 including coating facing surfaces of the molds and any mold inserts with Partingkote #8302 material before performing said steps c. and d.

5. The method according to claim 1 including making a polyurethane foam by mixing approximately 38 parts by weight of Part "A" and approximately 152 parts by weight of Part "B" of Foamex Polyurethane System XR-35 Neutral Brown Pigmented material and forming an abdominal shell for receiving the fetal insert.

6. The method according to claim 1 including making a polyurethane foam by mixing approximately 38 parts by weight of Part "A" and approximately 152 parts by weight of Part "B" of Foamex Polyurethane System XR-35 Neutral Brown Pigmented material and forming a chest flesh assembly for the fetal insert assembly.

7. In a crash test dummy having torso with an abdominal cavity formed in a front side thereof for receiving an abdominal insert, a fetal insert assembly for use with the crash test dummy to simulate a pregnant human female during a crash test, the fetal insert comprising:

an abdominal shell shaped as a pregnant female abdomen and adapted to be removably received and retained in an abdominal cavity formed in a front side of a crash test dummy, said abdominal shell having an insert cavity formed therein with an opening at a rear of said abdominal shell;

a fetal body simulating a human fetus in shape and weight, said fetal body having a head portion and a chest portion connected to said head portion, said fetal body being formed from a castable urethane elastomer; and a fetal insert adapted to be inserted into said insert cavity through said opening and retained in said insert cavity during a crash test, said fetal insert being formed as a hollow body having a wall extending about and enclosing a fetal cavity for receiving and retaining said fetal body, said wall having an elongated slit formed therein, said elongated slit having abutting sides and said wall being formed of a flexible material whereby when said wall is deformed to separate said abutting sides, an opening is formed through which said fetal body is inserted into and removed from said fetal cavity and when said fetal insert is inserted into said insert cavity, said elongated slit faces away from said abdominal shell opening to retain said fetal body in said fetal cavity.

8. The fetal insert assembly according to claim 7 wherein said castable urethane elastomer is formed from a mixture of approximately 220 grams of Skinflex III Part "A" and approximately 440 grams of Skinflex III Part "B".

9. The fetal insert assembly according to claim 7 wherein said castable urethane elastomer is a first castable urethane elastomer and said flexible material of said fetal insert is a second castable urethane elastomer.

10. The fetal insert assembly according to claim 9 wherein said first castable urethane elastomer is formed from a mixture of approximately 220 grams of Skinflex III Part "A" and approximately 440 grams of Skinflex III Part "B".

11. The fetal insert assembly according to claim 9 wherein said second castable urethane elastomer is formed from a mixture of approximately 300 grams of Skinflex III Part "A", approximately 600 grams of Skinflex III Part "B" and approximately 800 grams of Skinflex III Part "C".

12. The fetal insert assembly according to claim 7 wherein said abdominal shell is formed from a polyurethane foam mixture of approximately 38 parts by weight of Part "A" and approximately 152 parts by weight of Part "B" of Foamex Polyurethane System XR-35 Neutral Brown Pigmented material.

13. The fetal insert assembly according to claim 7 including a chest flesh assembly adapted to cover a front and part of sides of an upper chest portion of the dummy.

14. The fetal insert assembly according to claim 13 wherein said chest flesh assembly is formed from a polyurethane foam mixture of approximately 38 parts by weight of Part "A" and approximately 152 parts by weight of Part "B" of Foamex Polyurethane System XR-35 Neutral Brown Pigmented material.

15. In a crash test dummy having torso with an abdominal cavity formed in a front side thereof for receiving an abdominal insert, a fetal insert assembly for use with the crash test dummy to simulate a pregnant human female during a crash test, the fetal insert comprising:

an abdominal shell shaped as a pregnant female abdomen and adapted to be removably received and retained in an abdominal cavity formed in a front side of a crash test dummy, said abdominal shell having an insert cavity formed therein with an opening at a rear of said abdominal shell;

a fetal body simulating a human fetus in shape and weight, said fetal body having a head portion and a chest portion connected to said head portion, said fetal body being formed from a first castable urethane elastomer being a mixture of approximately 220 grams of Skinflex III Part "A" and approximately 440 grams of Skinflex III Part "B"; and a fetal insert removably retained in said abdominal shell and having a wall extending about and enclosing a fetal cavity for receiving and retaining said fetal body, said wall having an elongated slit formed therein, said elongated slit having abutting sides and said wall being formed of a flexible material whereby when said wall is deformed to separate said abutting sides, an opening is formed through which said fetal body is inserted into and removed from said fetal cavity, said flexible material being a second castable urethane elastomer being a mixture of approximately 300 grams of Skinflex III Part "A", approximately 600 grams of Skinflex III Part "B" and approximately 800 grams of Skinflex III Part "C".

* * * * *